(12) United States Patent
Tamhankar et al.

(10) Patent No.: US 8,644,301 B2
(45) Date of Patent: Feb. 4, 2014

(54) SYSTEMS AND METHODS OF SUPPORTING EMERGENCY COMMUNICATIONS

(75) Inventors: Arundhati Tamhankar, Kirkland, WA (US); Michael Brothers, Kirkland, WA (US); Stevan Klesper, Snohomish, WA (US); Curt Jutzi, Lake Oswego, OR (US); Kurt Christian Schmidt, Chapel Hill, NC (US); Masud Kibria, Seattle, WA (US); Cathy Massey, Bethesda, MD (US); Erin Boone, McLean, VA (US)

(73) Assignee: Clearwire IP Holdings LLC, Bellevue, WA (US)

(*) Notice: Subject to any disclaimer, the term of this patent is extended or adjusted under 35 U.S.C. 154(b) by 560 days.

(21) Appl. No.: 12/955,466

(22) Filed: Nov. 29, 2010

(65) Prior Publication Data

US 2012/0134345 A1 May 31, 2012

(51) Int. Cl.
| | | |
|---|---|---|
| *H04W 4/00* | (2009.01) |
| *H04L 12/66* | (2006.01) |
| *H04M 11/04* | (2006.01) |
| *H04W 4/22* | (2009.01) |
| *H04W 88/06* | (2009.01) |
| *H04W 48/18* | (2009.01) |

(52) U.S. Cl.
CPC ............... *H04W 4/22* (2013.01); *H04W 88/06* (2013.01); *H04W 48/18* (2013.01)
USPC ............ 370/352; 370/328; 370/338; 379/37; 379/45; 455/404.1; 455/404.2

(58) Field of Classification Search
CPC ........ H04W 4/22; H04W 88/06; H04W 48/18
USPC ...................... 370/328, 338, 352; 379/37, 45; 455/404.1, 404.2
See application file for complete search history.

(56) References Cited

U.S. PATENT DOCUMENTS 6,801,762 B1   10/2004 Huilgol
7,292,864 B1 * 11/2007 Al-Khashti et al. ....... 455/456.1

(Continued)

OTHER PUBLICATIONS

Sun Ok Park; Mi-Young Huh; Wook Hyun; Jae Cheon Han; Shin-Gak Kang, "SIP based VoIP System for E911 Service," Optical Internet and Next Generation Network, 2006. COIN-NGNCON 2006. The Joint International Conference on , vol., No., pp. 97,99, Jul. 9-13, 2006.*

(Continued)

*Primary Examiner* — Ayaz Sheikh
*Assistant Examiner* — Tarell Hampton

(57) ABSTRACT

Systems and methods for supporting E911 for VoIP mobile communications are provided. A mobile station formats a call setup message by including particular information in a header portion of the call setup message that is used by the wireless network to select an appropriate PSAP and route the call to the appropriate PSAP.

24 Claims, 13 Drawing Sheets

(56) References Cited

U.S. PATENT DOCUMENTS

| | | |
|---|---|---|
| 7,573,380 B2 | 8/2009 | Pinder |
| 2005/0197137 A1* | 9/2005 | Radic et al. ............... 455/456.1 |
| 2006/0271693 A1* | 11/2006 | Thiebaut et al. ............. 709/229 |
| 2007/0058615 A1* | 3/2007 | Hasenfang et al. ........... 370/352 |
| 2008/0014956 A1* | 1/2008 | Balasubramanian ...... 455/452.1 |
| 2008/0026728 A1* | 1/2008 | Snapp et al. ............... 455/414.1 |
| 2008/0205386 A1* | 8/2008 | Purnadi et al. ................ 370/389 |
| 2010/0202368 A1 | 8/2010 | Hans |
| 2011/0110300 A1* | 5/2011 | Sachs et al. ................... 370/328 |

OTHER PUBLICATIONS

International Search Report and Written Opinion of the International Searching Authority in PCT/US11/61842 both dated Jan. 31, 2013.
Mintz-Habib, Matthew, et al., "A VoIP Emergency Services Architecture and Prototype," 2005 IEEE, pp. 523-528.

* cited by examiner

SYSTEMS AND METHODS OF SUPPORTING EMERGENCY COMMUNICATIONS

BACKGROUND OF THE INVENTION

Government laws and regulations require telephone calls to be compatible with emergency 911 (E911) systems by selecting a public safety answering point (PSAP) in an area proximate to the caller's location and providing the PSAP with the caller's location. For conventional fixed-line stations in which calls are initiated over the circuit-switched, public switched telephone network (PSTN), this has conventionally been implemented using databases containing location information (e.g., a street address) associated with each telephone number.

Unlike fixed-line stations, mobile stations do not have a fixed location that can be stored in a database. Accordingly, supporting E911 for mobile stations requires determining the location of the mobile station when the emergency call is initiated. Because of the difficulties of supporting E911 for mobile stations, government regulations provide for two different types of support for E911, E911 Phase I and E911 Phase II, the difference being the granularity of the location of the mobile station. E911 Phase I provides the PSAP with the location of the radio tower (i.e., cell site tower) that supports the mobile station, which is a very coarse measure of the mobile station's location. The granularity of the location for E911 Phase II support depends upon whether the mobile station's location is a device-based technique or a network-based technique. A device-based technique requires that the location of the mobile station be within 50 meters or less 67% of the time, and the location of the mobile station be within 150 meters or less 95% of the time. A network-based technique requires that the mobile station's location be within 100 meters 67% of the time and the mobile station's location is within 300 meters 95% of the time.

SUMMARY OF THE INVENTION

The introduction of fixed-line Voice over Internet Protocol (VoIP) telephony using packet-switched communication networks introduced a further complication into supporting E911 because VoIP calls are not initiated over the PSTN. One solution to supporting E911 for fixed-line VoIP telephony is to use databases in the packet-switched network containing location information (e.g., a street address) associated with each telephone number. This is an acceptable solution because the fixed-line station typically does not change geographic locations.

The issue of supporting E911 become further complicated by VoIP telephony for mobile stations, and in particular for networks supporting VoIP for both fixed-line and mobile stations. Exemplary embodiments of the present invention address this and other issues related to supporting E911 calls.

Exemplary embodiments of the present invention provide systems and methods for supporting E911 for VoIP mobile communications. In accordance with an aspect of the present invention, the mobile station formats a call setup message by including particular information in a header portion of the call setup message that is used by the wireless network to select an appropriate PSAP and route the call to the appropriate PSAP.

Other objects, advantages and novel features of the present invention will become apparent from the following detailed description of the invention when considered in conjunction with the accompanying drawings.

BRIEF DESCRIPTION OF THE DRAWING FIGURES

Figure 7A:
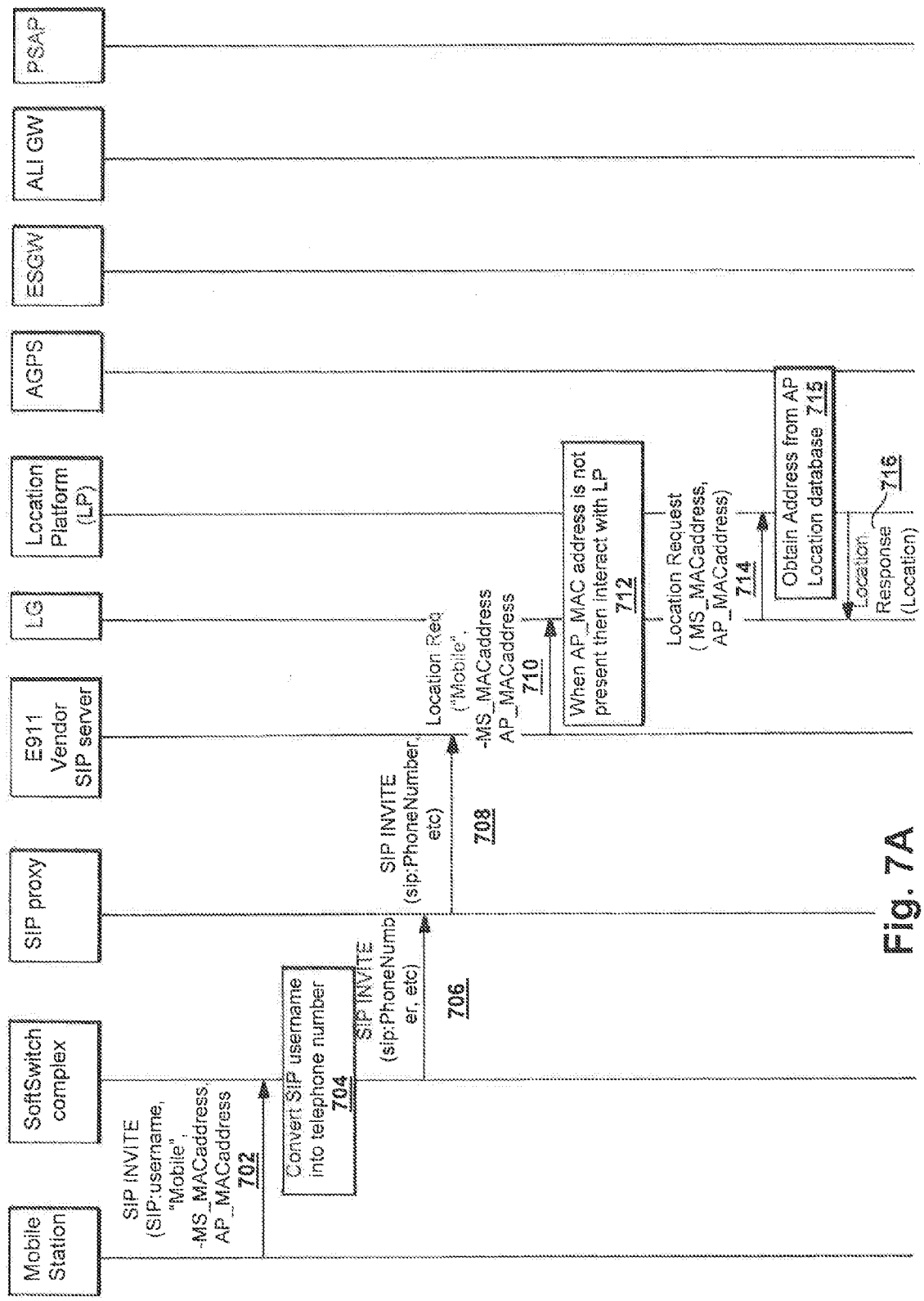
Figure 7B:
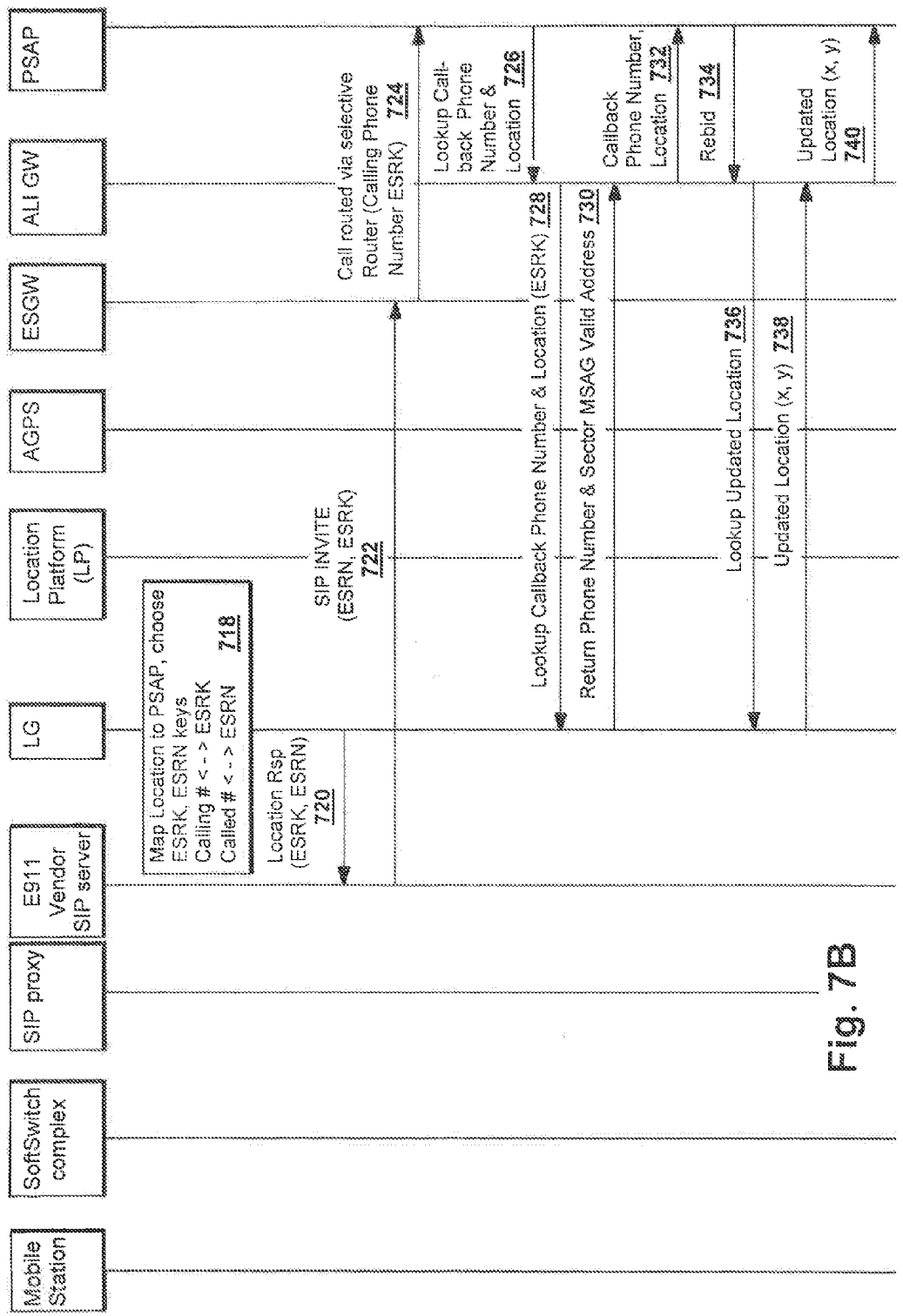
Figure 8:
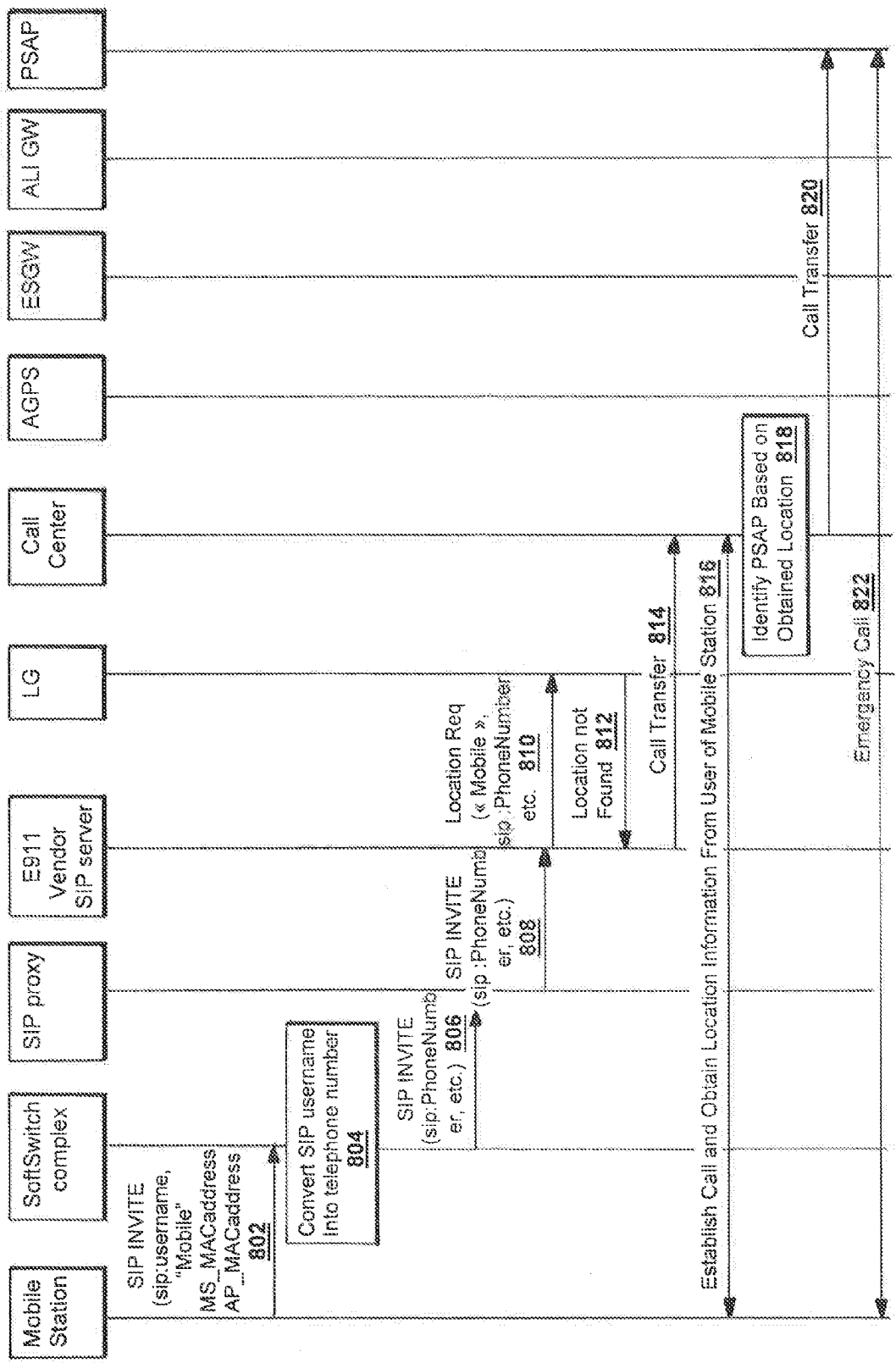

FIGS. 7A and 7B are exemplary call flow diagrams for an emergency call initiated by a mobile station using VoIP over a wireless local area network, such as a WiFi network in accordance with the present invention; and FIG. 8 is an exemplary call flow diagram for an emergency call initiated by a mobile station using VoIP over a wireless local area network, such as a WiFi network in accordance with the present invention.

DETAILED DESCRIPTION OF THE PREFERRED EMBODIMENTS

Figure 1A:
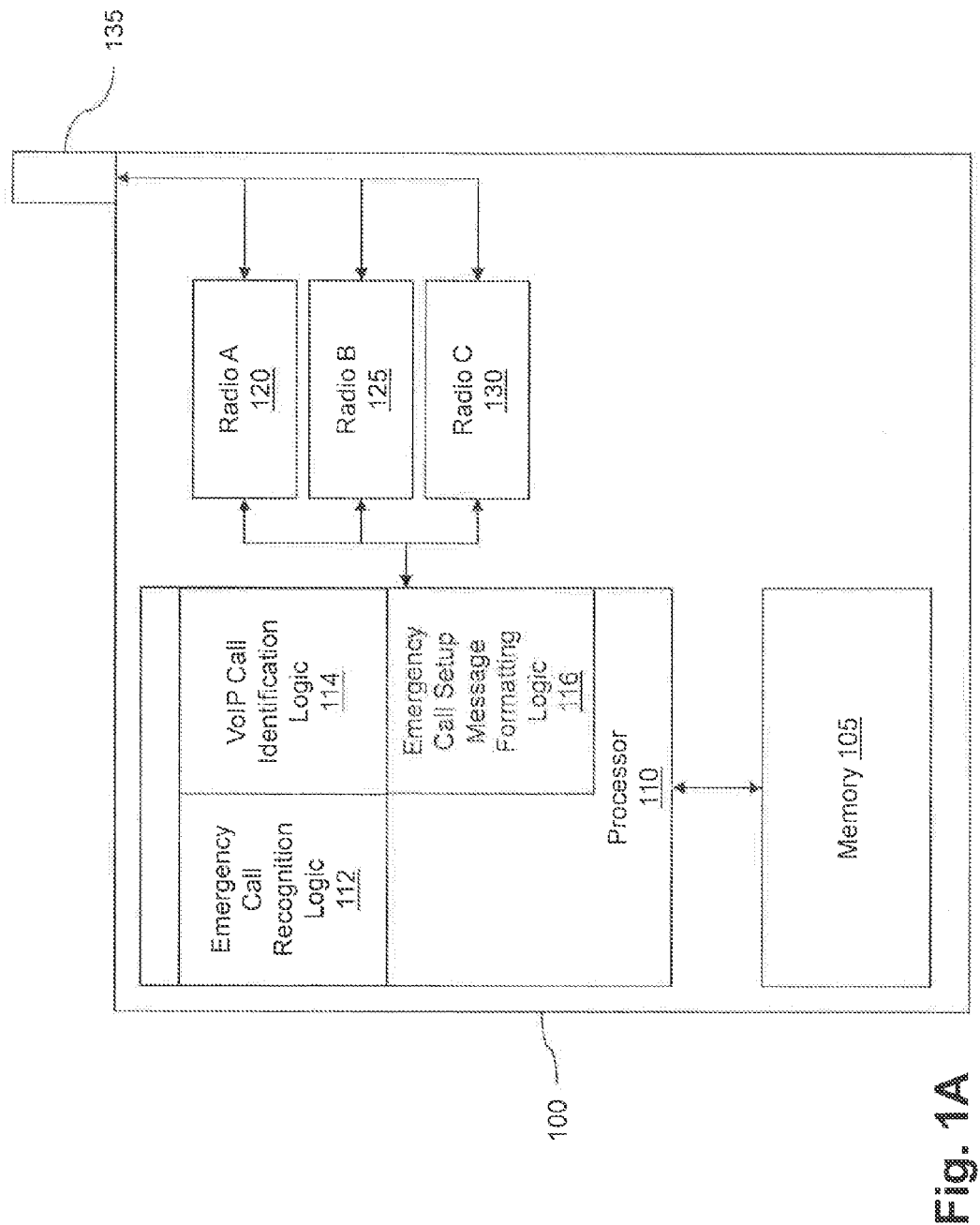
FIG. 1A is a block diagram of an exemplary mobile station in accordance with one aspect of the present invention.

FIG. 1A is a block diagram of an exemplary mobile station in accordance with one aspect of the present invention. The mobile station 100 includes a processor 110 coupled to memory 105 and one or more wireless radios 120-130. Wireless radios 120-130 are coupled to antenna 135. It should be recognized that mobile station 100 can include additional components, including a keyboard, display, modulators, upconverters, downconverters, Global Positioning Satellite (GPS) receiver and/or a camera module. Additionally, a switch or diplexer can be placed between wireless radios 120-130 and antenna 135 and between processor 110 and wireless radios 120-130.

Processor 110 can be any type of processor, including a field programmable gate array (FPGA), application specific integrated circuit (ASIC) and/or a microprocessor. Processor 110 includes logic 112-116, which are used to perform the method of FIG. 1B. When processor 110 is a FPGA or ASIC, logic 112-116 is non-transitory hard-wired logic. When processor 110 is a microprocessor, logic 112-116 can be machine-readable code that is loaded into processor 110 from memory 105. Memory 105 can be any type of non-transitory tangible media, including random access memory (RAM), read only memory (ROM), flash memory, a hard disk and/or the like.

Wireless radios 120-130 can each support a different type of radio access network. For example, wireless radio 120 can support a commercial radio system network, such as a GSM or CDMA network; wireless radio 125 can support a 4th generation network, such as a WiMAX or LTE network; and wireless radio 130 can support a local area wireless network, such as a WiFi network, including 802.11 a, b, g and/or n network.

Figure 1B:
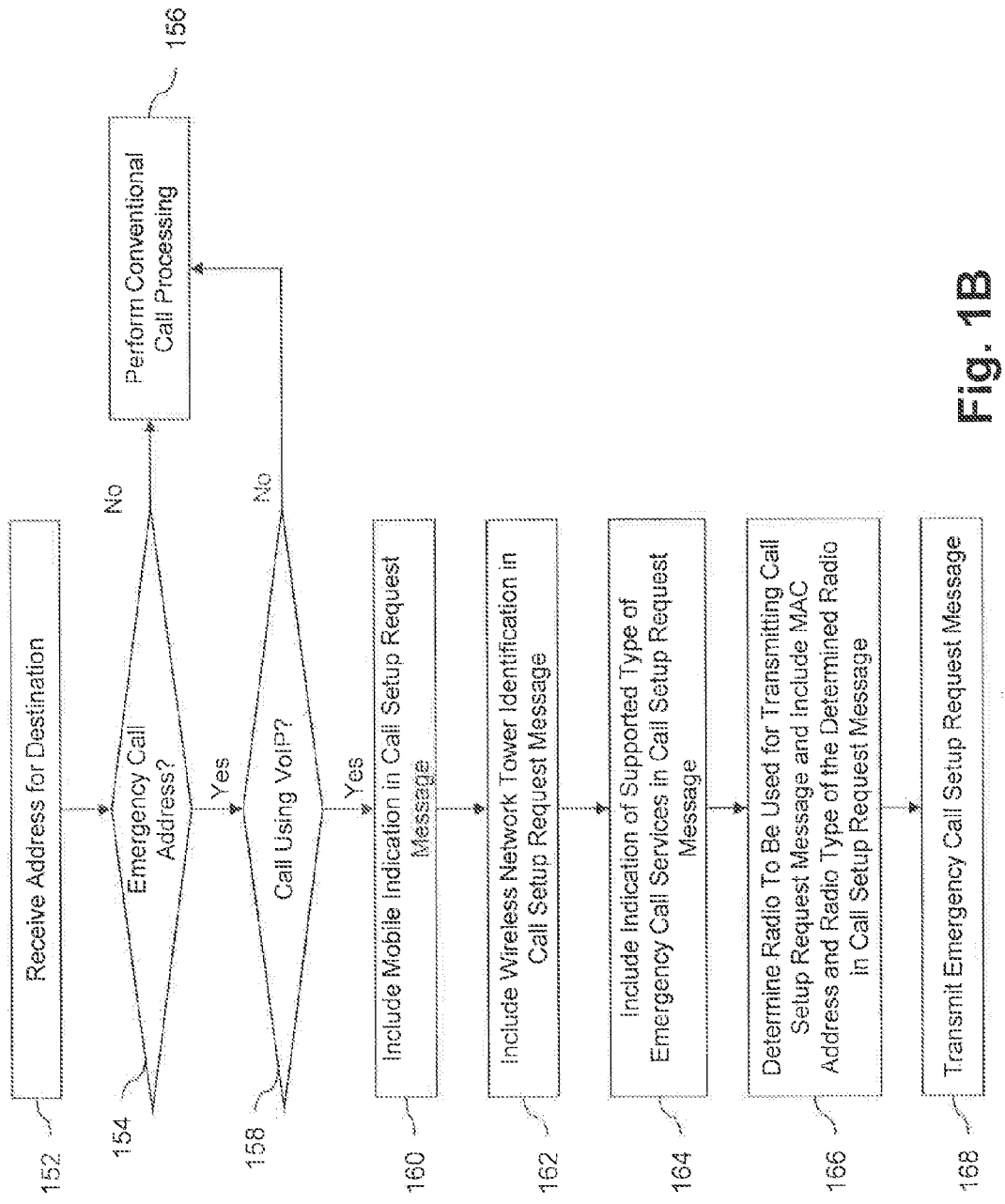
FIG. 1B is a flow diagram of an exemplary method for a mobile station in accordance with one aspect of the present invention.

FIG. 1B is a flow diagram of an exemplary method for a mobile station in accordance with one aspect of the present invention. Initially, processor 110 receives an address for a destination (step 152) and logic 112 determines whether the received address is an emergency call address (step 154). It will be recognized that type of address used for emergency call addresses can vary, such as 911 in the United States, 999 in the United Kingdom, 112 in many other European countries. The particular format of the emergency call address is not critical so long as the mobile station is programmed to recognize the address. When the received address is not an emergency call address ("No" path out of decision step 154), then processor 110 processes the call in a conventional manner (step 156). Logic 114 then determines whether the call is a VoIP call (step 158). When the call is not a VoIP call ("No" path out of decision step 158), then processor 110 processes the call in a conventional manner for an emergency call over a circuit-switched wireless network (step 156).

When the received address is an emergency call address and the call is a VoIP call ("Yes" path out of decisions step 156 and 158), then logic 116 formats the call setup message as an emergency call setup message. As will be described in more detail below in connection with FIGS. 5A-8, the information included by the mobile station in the call setup message is used by the network to select an appropriate PSAP for the mobile station's location and to route the call to the selected PSAP. The various information can be included in a header of the call setup message, which in the case of a VoIP call can be a session initiation protocol (SIP) INVITE message.

The formatting involves logic 116 including an indication that the call is from a mobile station (step 160), an identification of the wireless network tower supporting the mobile station, if available, (step 162), and an indication of the type of supported emergency call services (e.g., E911 Phase I or Phase II) (step 164). Additionally, logic 116 determines which one of the wireless radios 120-130 that will be used for transmitting the emergency call setup message and includes the medium access control (MAC) address of this radio and an indication of the type of radio in the emergency call setup message (step 166). As will be described in more detail below, two of the wireless radios can support VoIP communications over different types of networks, and the MAC address of wireless network tower communicating with the mobile station's radio can be used for identifying the mobile station's location and selecting the appropriate PSAP.

Processor 110 then controls the determined radio to transmit the emergency call setup request message to a wireless network using antenna 135 (step 168). Although FIG. 1B illustrates the inclusion of information in the call setup request in a particular order, the information can be included in a different order and can be included at the same time. Additionally, depending upon implementation, the emergency call setup request message can include more information or less information than that described in connection with FIG. 1B.

Figure 2A:
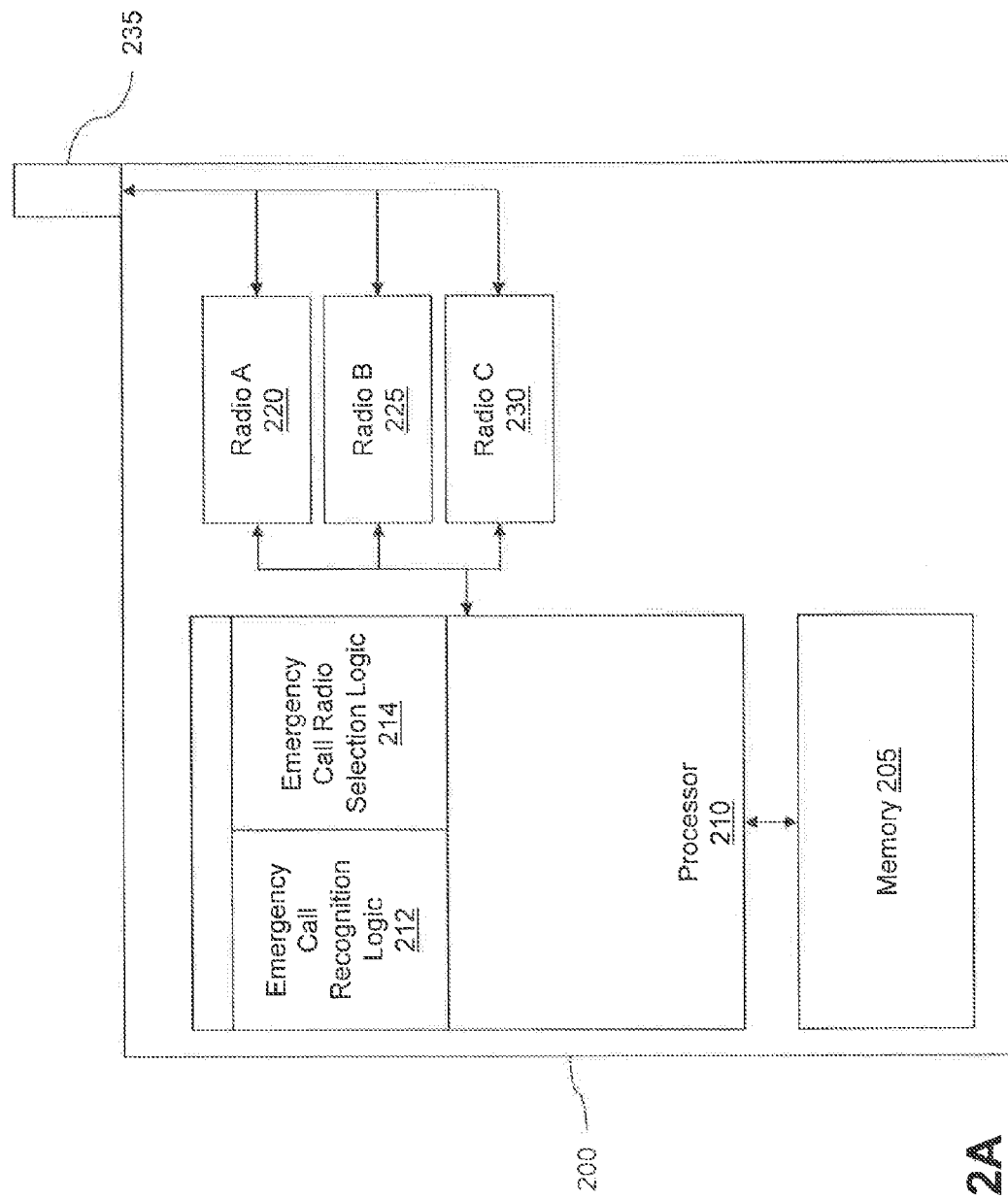
FIG. 2A is a block diagram of an exemplary mobile station in accordance with one aspect of the present invention.

FIG. 2A is a block diagram of an exemplary mobile station in accordance with one aspect of the present invention. The mobile station 200 includes a processor 210 coupled to memory 205 and one or more wireless radios 220-230. Wireless radios 220-230 are coupled to antenna 235. It should be recognized that mobile station 200 can include additional components, including a keyboard, display, modulators, upconverters, downconverters, GPS receiver and/or a camera module. Additionally, a switch or diplexer can be placed between wireless radios 220-230 and antenna 235 and between processor 210 and wireless radios 220-230.

Processor 210 can be any type of processor, including a field programmable gate array (FPGA), application specific integrated circuit (ASIC) and/or a microprocessor. Processor 210 includes logic 212 and 214, which are used to perform the method of FIG. 2B. When processor 210 is a FPGA or ASIC, logic 212 and 214 is non-transitory hard-wired logic. When processor 210 is a microprocessor, logic 212 and 214 can be machine-readable code that is loaded into processor 210 from memory 205. Memory 205 can be any type of non-transitory tangible media, including random access memory (RAM), read only memory (ROM), flash memory, a hard disk and/or the like.

Wireless radios 220-230 can each support a different type of radio access network. For example, wireless radio 220 can support a commercial radio system network, such as a GSM TDMA network or a CDMA network; wireless radio 225 can support a 4th generation network, such as a WiMAX or LTE network; and wireless radio 230 can support a local area wireless network, such as a WiFi network, including 802.11 a, b, g and/or n network.

Figure 2B:
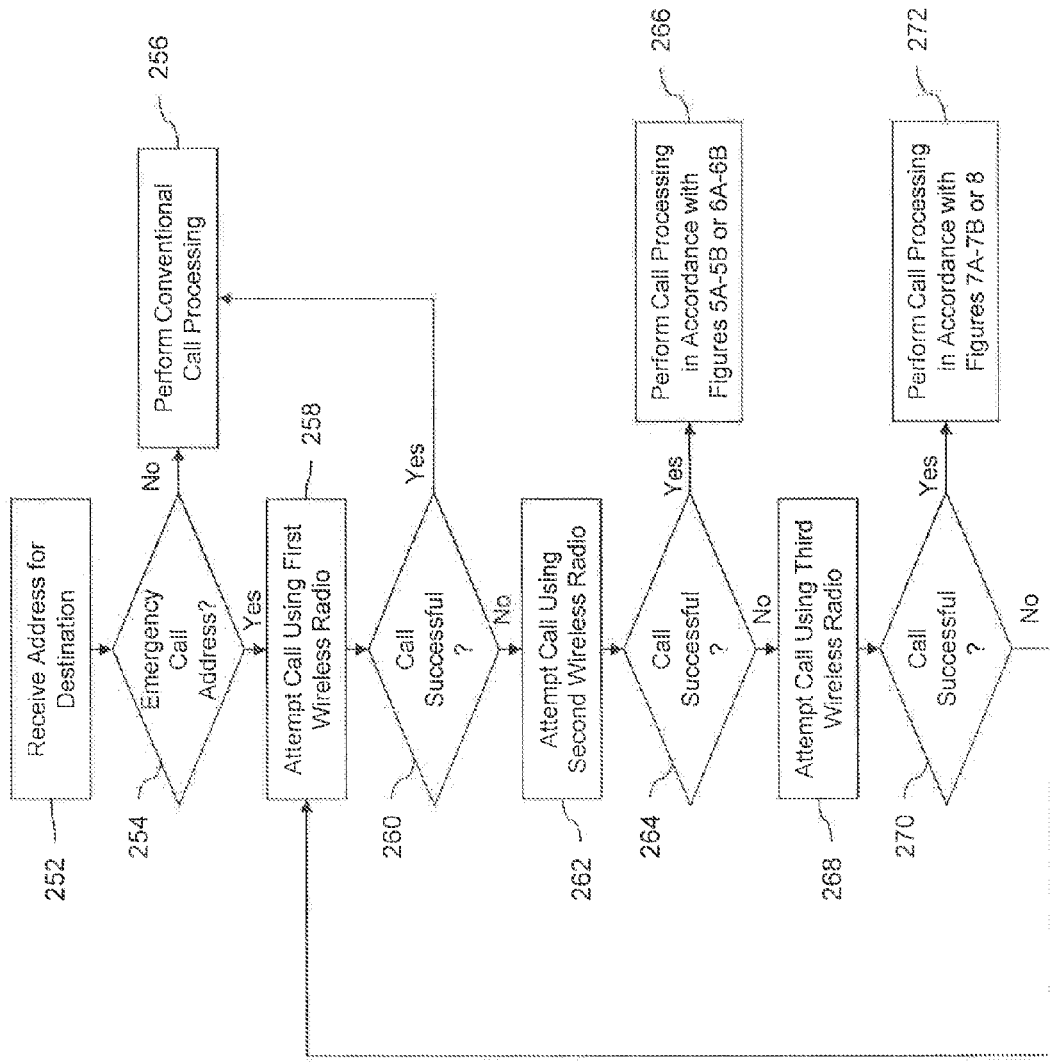
FIG. 2B is a flow diagram of an exemplary method for a mobile station in accordance with one aspect of the present invention.

FIG. 2B is a flow diagram of an exemplary method for a mobile station in accordance with one aspect of the present invention. Initially, processor 210 receives an address for a destination (step 252) and logic 212 determines whether the received address is an emergency call address (step 254). Again, the type of address used for emergency call addresses can vary and the mobile station can be programmed to recognize one or more emergency call addresses. When the received address is not an emergency call address ("No" path out of decision step 254), then processor 210 processes the call in a conventional manner (step 256).

When logic 212 determines that the received address is an emergency call address ("Yes" path out of decision step 254), logic 214 makes sequential attempts to make the emergency call using the three wireless radios 220-230. The order of the selection of the radios can be based on, for example, the type of network used by the radio. In particular, a commercial mobile radio system network typically has the most mature support for handling emergency calls. A 4th generation network, such as WiMAX or LTE, has less mature support for handling emergency calls, however as described in more detail below these types of networks can provide acceptable handling of emergency calls. WiFi networks have the least mature support for handling emergency calls, but as described in more detail below can provide acceptable handling of these types of calls.

Accordingly, logic 214 makes a first attempt to complete the emergency call using a first one of the wireless radios that supports a commercial mobile radio system network (step 258). As used herein, the attempt to make a call can involve logic 214 determining whether the mobile station is within the coverage area of a particular network, and when the mobile station is not within the coverage area then the call attempt will be determined to be unsuccessful. Additionally, a call attempt can involve logic 214 determining that the mobile station is within the coverage area of a particular network but is in a location that would not support the call based on, for example, the strength of signals received from the particular network. Moreover, a call attempt can involve the mobile station attempting to setup a call but being denied either by an explicit message from the network or implicitly by failing to receive a response from the network.

When logic 214 determines that the first call attempt was successful ("Yes" path out of decision step 260), then conventional call processing is performed (step 256). For an emergency call this involves providing a mobile station identifier and an indication of the mobile station's geographic location (e.g., the identification of the supporting base station) so that the call is routed to the appropriate PSAP. When logic 214 determines that the first call attempt was not successful ("No" path out of decision step 260), then logic 214 makes a second attempt to complete the call using a wireless radio that supports a 4th generation network, such as WiMAX or LTE (step 262).

When logic 214 determines that the second call attempt was successful ("Yes" path out of decision step 264), then the call processing is performed in accordance with FIGS. 5A-5B or 6A-6B (step 266). When logic 214 determines that the second call attempt was not successful ("No" path out of decision step 264), then logic 214 makes a third attempt to complete the call using a wireless radio that supports a WiFi network (step 268). When logic 214 determines that the third call was successful ("Yes" path out of decision step 270), then the call processing is performed in accordance with FIGS. 7A-7B or 8 (step 272). When logic 214 determines that the third call attempt was not successful ("No" path out of decision step 270), then logic 214 makes an attempt to complete the call using the wireless radio that supports a commercial mobile radio system network (step 258). Alternatively, the call can be treated as a failed call when the third call attempt is not successful. In this case the emergency call would have to be reinitiated by the user of the mobile station.

Although the mobile station of FIG. 1A has been described as performing the method of FIG. 1B and the mobile station of FIG. 2A has been described as performing the method of FIG. 2B, a single mobile station can perform both methods. Such a mobile station would include logic 114, 116 and 214, and one of logic 112 or 212, and the mobile station would include the indications described in connection with FIG. 1B only for the second and third attempts using the second and third wireless radios because these radios support VoIP calls.

Figure 3:
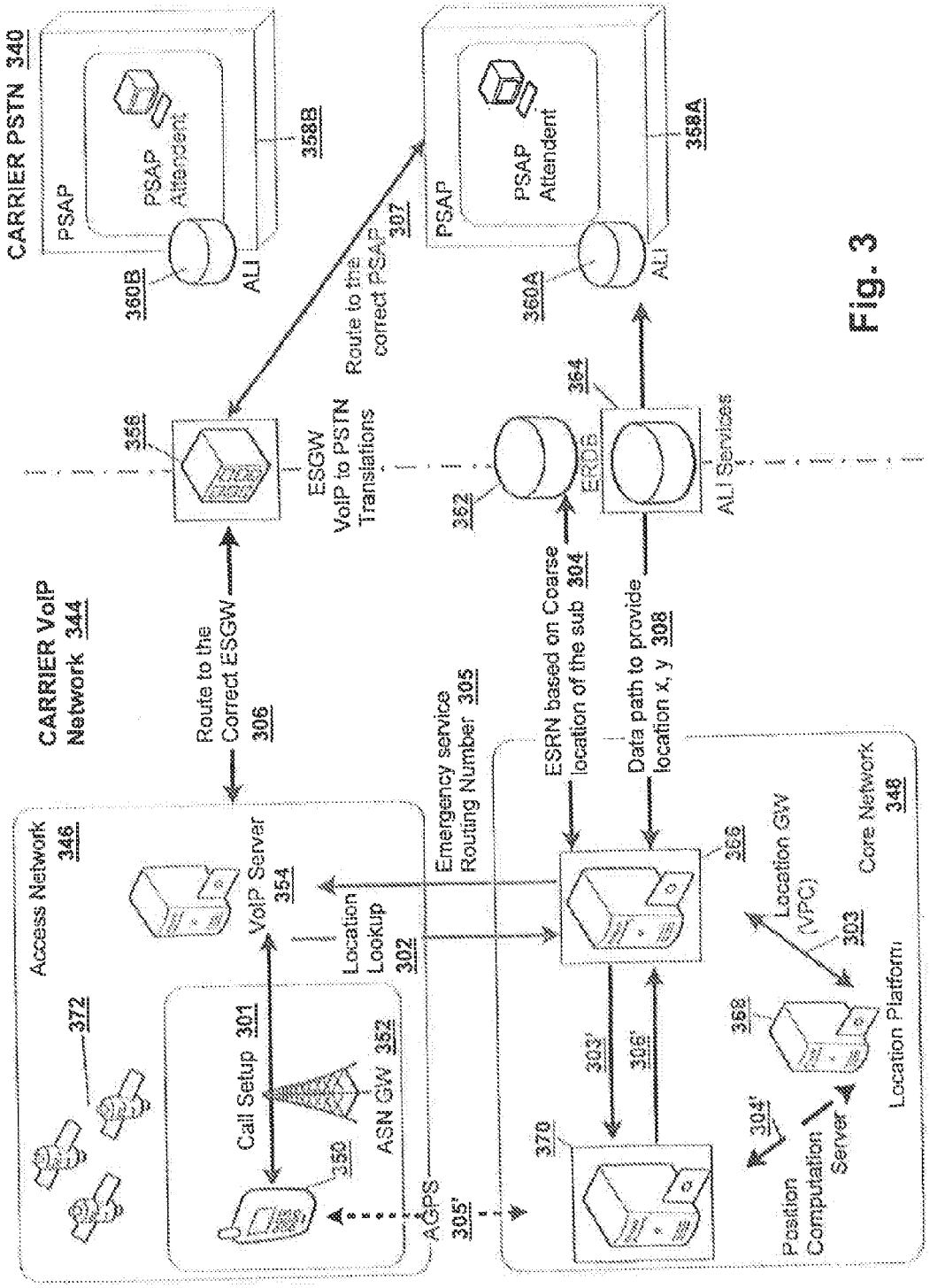
FIG. 3 is a block diagram of an exemplary system in accordance with the present invention.

FIG. 3 is a block diagram of an exemplary system in accordance with the present invention. The system is logically divided between a carrier PSTN 340 and a carrier VoIP network 344. The carrier PSTN 340 includes one or more public safety answering points (PSAPs) 358A and 358B, each of which includes one or more PSAP attendants for receiving emergency calls. The carrier VoIP network 344 couples calls to the PSAPs via an emergency services gateway (ESGW) 356, which converts calls from VoIP format into a format compatible with the PSTN. Each PSAP 358A, 358B, includes an automatic location identification (ALI) database 360A, 360B that coordinates location identification with ALI services database 364. The carrier PSTN 340 also includes an emergency response database (ERDB) 362 that stores information about the particular PSAP to be used for different geographical locations.

The carrier VoIP network 344 is logically split between an access network 346 and a core network 348. The access network 346 provides access to a number of mobile stations 350, which are coupled to a VoIP server 354 via an application service node gateway (ASN GW) 352. It will be recognized that an access network will include a number of ASN GWs, each providing coverage for different geographical areas.

The core network includes a location gateway 366, location platform 368 and position computation server 370 (e.g., a secure user plane location (SUPL) server). It will be recognized that the core network can include network elements in addition to those illustrated in FIG. 3, including an authentication, authorization, and accounting (AAA) server. Furthermore, although FIG. 3 illustrates nodes and network elements as being part of the access network or core network, these nodes and network elements can be part of the access network, core network and/or can be hosted or remotely located.

Now that the basic architecture of the system of FIG. 3 has been described, a high-level description of the call flow for a VoIP emergency call over a 4th generation wireless network (e.g., a WiMAX or LTE network) will be described. This high level call flow generally corresponds to the detailed call flow of FIGS. 6A-7B, which is described in more detail below. Initially, mobile station 350 performs a call setup with VoIP server 354 (step 301). The call setup message transmitted by mobile station 350 can be formatted in the manner described above in connection with FIGS. 1A and 1B. VoIP server 354 determines that the call is an emergency call and sends a location lookup request to location gateway 366 (step 302). Alternatively, VoIP server 354 can send the call to the E911 provider's VoIP server (not illustrated), which will then perform the location lookup with location gateway 366. In either case, location gateway 366 then informs location platform 368 (step 303) and position computation server 370 (step 303') of the need to obtain the location of mobile station 350. Location gateway 366 then contacts ERDB 362 to obtain the emergency services routing number (ESRN) based on a coarse location of the mobile station 350 (step 304). This coarse location can be based on, for example, the location of the base station associated with ASN GW 352 that is supporting mobile station 350.

Location gateway 366 provides the emergency service routing number to VoIP server 354 (step 305). Position computation server 370 exchanges assisted GPS (AGPS) information with mobile station 350 (step 305') in order to allow the mobile station to obtain its location using signals received from GPS satellites 372. Based on the emergency service routing number, VoIP server 354 selects the appropriate ESGW and routes the emergency call to the appropriate ESGW (step 306), which in turn routes the call to the appropriate PSAP (step 307). Upon request by the PSAP, a data path is established between ALI services 364 and location gateway 366 to provide the geographical x, y coordinates of base station associated with the ASN GW 352 supporting mobile station 350 (step 308), which then provides this information to the selected PSAP.

Once the location of mobile station 350 is determined using GPS satellites 372, this information is passed to location gateway 366 via position computation server 370 (step 306'). The mobile station's location can be determined by the network or the mobile station. The GPS location information can be provided to the selected PSAP when the selected PSAP performs a location re-bid, which will be described in more detail below. Although FIG. 3 describes the more accurate location information being based on GPS information, the more accurate location information can be obtained using triangulation and/or a hybrid of GPS and triangulation.

Figure 4:
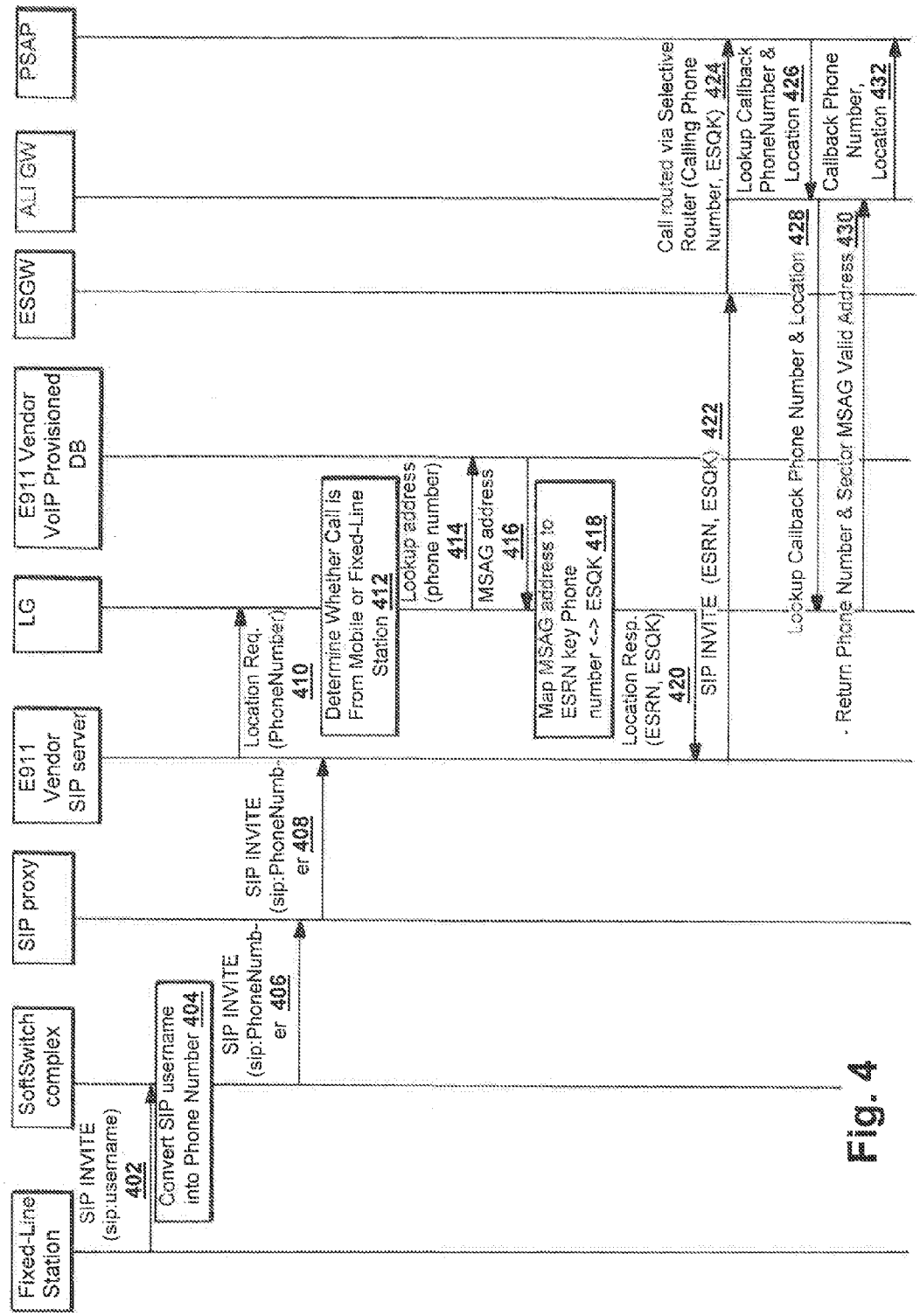
FIG. 4 is an exemplary call flow diagram for an emergency call initiated by a fixed-line station using VoIP.

FIG. 4 is an exemplary call flow diagram for an emergency call initiated by a fixed-line station using VoIP. Initially, the fixed-line station sends a SIP INVITE message including the user name to the softswitch complex (step 402). The softswitch complex converts the SIP user name into a telephone number (step 404) and forwards the SIP INVITE message including the telephone number to the SIP proxy (step 406). The SIP proxy forwards the SIP INVITE message to the emergency 911 vendor's SIP server (step 408), which then sends a location request message containing the telephone number to the location gateway (step 410).

The location gateway determines whether the call is from a mobile station or a fixed line station (step 412). Specifically, as discussed above in connection with FIGS. 1A and 1B, mobile stations insert a special mobile identifier into the call setup request message, which would be used by the location gateway to determine that the call is from a mobile station. Because the fixed line station does not include any such indication, the location gateway determines that the call is from a fixed-line station by the absence of such an indication. Alternatively, if desired, the fixed-line station can send a "fixed" indication in the call setup message to identify that the station is a fixed-line station.

The location gateway, which can be operated by the carrier and/or the E911 vendor, then sends a message with the calling telephone number to request an address lookup to the emergency 911 vendor VoIP provisioned database (step 414), which replies with a master street address guide (MSAG) address for the geographic location of the fixed-line station (step 416). The location gateway then maps the MSAG address to the emergency services routing number (ESRN) and the fixed station's telephone number to the ESQK (step 418). The location gateway then provides a location response that includes the ESRN and ESQK to the emergency 911 vendor SIP server (step 420), which then sends a SIP INVITE that includes the ESRN and ESQK used to route the 911 call to the emergency services gateway (step 422).

The emergency services gateway then routes the call via the selective router to the PSAP (step 424). The PSAP sends a lookup for the callback telephone number and location request to the ALI gateway (step 426), which forwards the lookup to the location gateway (step 428). The location gateway then returns the telephone number and sector MSAG valid address to the ALI gateway (step 430), which then provides the callback number and location to the PSAP (step 432).

Figure 5A:
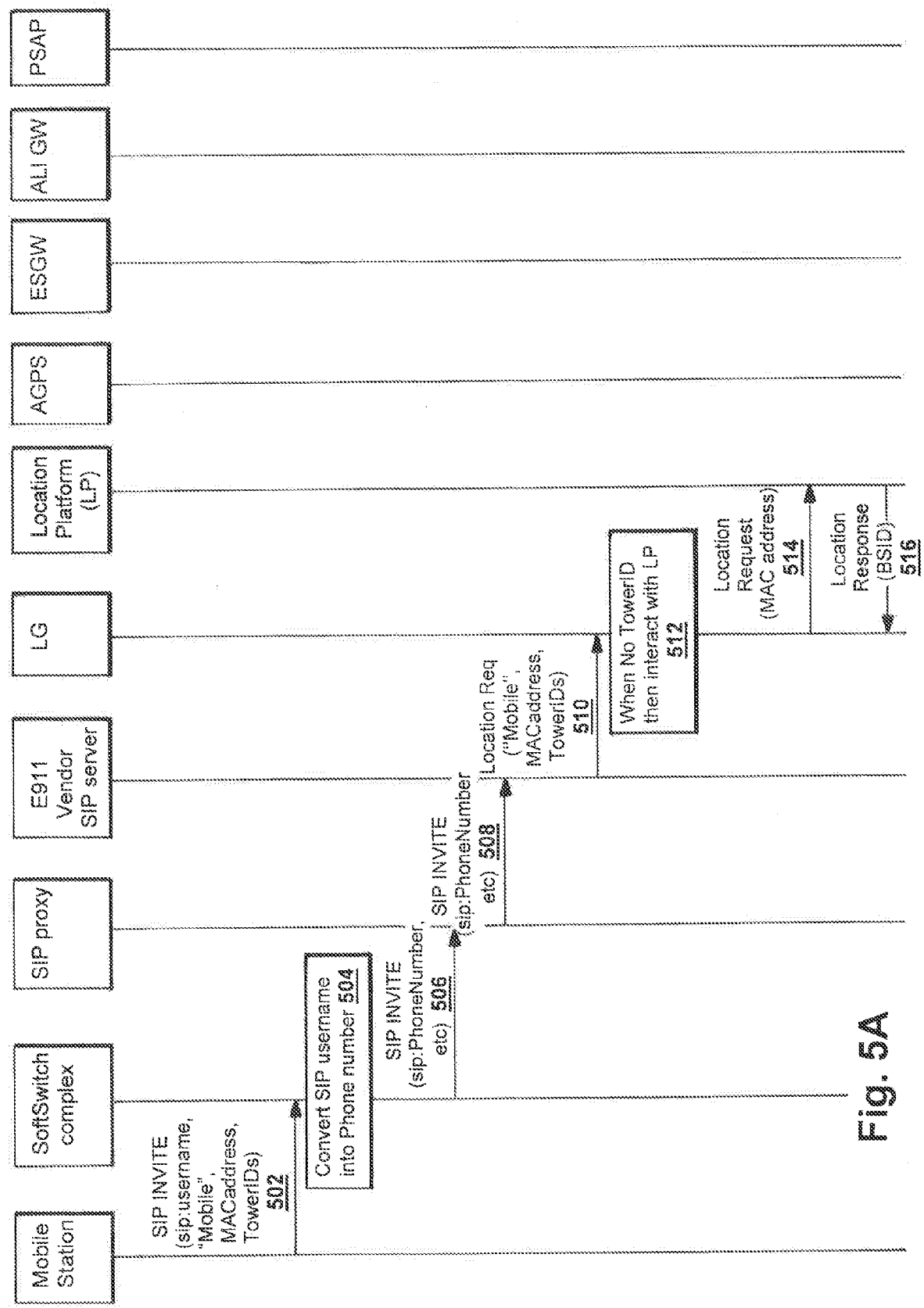
FIGS. 5A and 5B are exemplary call flow diagrams for an emergency call initiated by a mobile station using VoIP over a fourth generation network, such as a WiMAX or Long Term Evolution (LTE) network in accordance with the present invention.
Figure 5B:
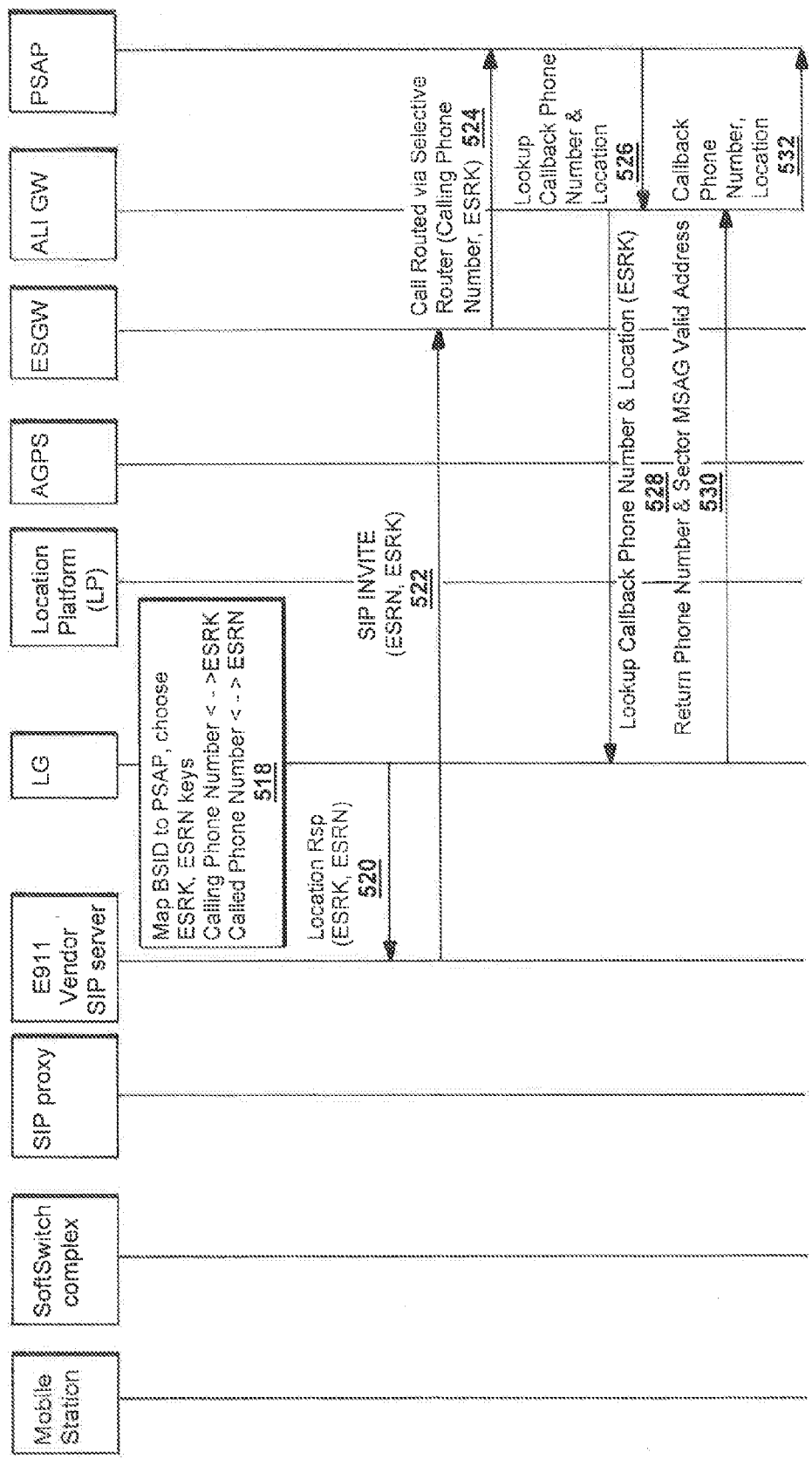

FIGS. 5A and 5B are exemplary call flow diagrams for an emergency call initiated by a mobile station using VoIP over a fourth generation network, such as a WiMAX or LTE network. Initially, the mobile station generates a SIP INVITE message formatted in the manner described above in connection with FIGS. 1A and 1B and forwards the message to the softswitch complex (step 502). In particular, the message includes the user name, the indication that the call is from a mobile station, the MAC address of the mobile station's wireless radio, the type of radio and the WiMAX or LTE tower identification. The softswitch complex converts the SIP user name into a telephone number and forwards the SIP INVITE message (including the telephone number, "mobile" indication, the MAC address of the mobile station's wireless radio, the type of radio and WiMAX or LTE tower identifications) to the SIP proxy (step 506), which then forwards the message to the emergency 911 vendor SIP server (step 508).

The emergency 911 vendor SIP server then sends a location request message, including the "mobile" indication, the MAC address of the mobile station's wireless radio, the type of radio and WiMAX or LTE tower identification, to the location gateway (step 510). When the SIP INVITE message from the mobile station does not include a base station identification, the location gateway determines that it should interact with the location platform (step 512) and sends a location request message (e.g., a standard location immediate request (SLIR)) that includes the MAC address of the mobile station's wireless radio to the location platform (step 514), which responds with a location response message (e.g., a standard location immediate answer (SLIA)) that includes the base station identification (step 516).

Turning now to FIG. 5B, the location gateway then maps the BSID to the appropriate PSAP, chooses the ESRK, ESRN keys, and maps the calling number to the ESRK and the called number to the ESRN (step 518). The location gateway then sends a location response that includes the ESRK and ESRN to the emergency 911 vendor SIP server (step 520). The emergency 911 vendor SIP server sends a SIP INVITE message that includes the ESRK and ESRN to the emergency services gateway (step 522), which then routes the call via the selective router to the PSAP (step 524). The PSAP then sends a lookup request for a callback number and location to the ALI gateway (step 526). The ALI gateway then sends the lookup request that includes the ESRK to the location gateway (step 528), which returns the telephone number and sector MSAG valid address (step 530). The ALI gateway then forwards the callback number and location to the PSAP (step 532).

Figure 6A:
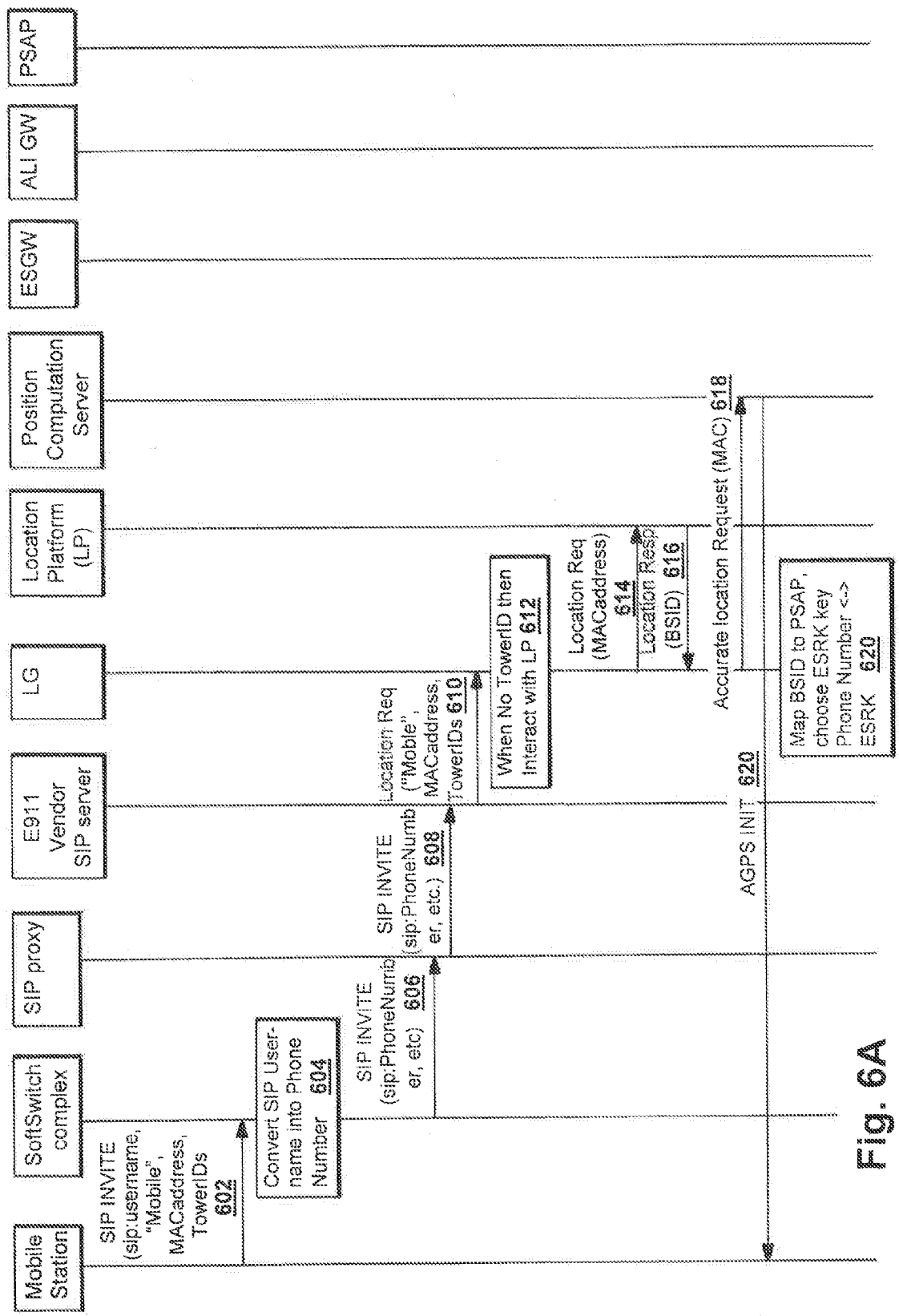
FIGS. 6A and 6B are exemplary call flow diagrams for an emergency call initiated by a mobile station using VoIP over a fourth generation network, such as a WiMAX or LTE network with re-bid to obtain more accurate location information in accordance with the present invention.
Figure 6B:
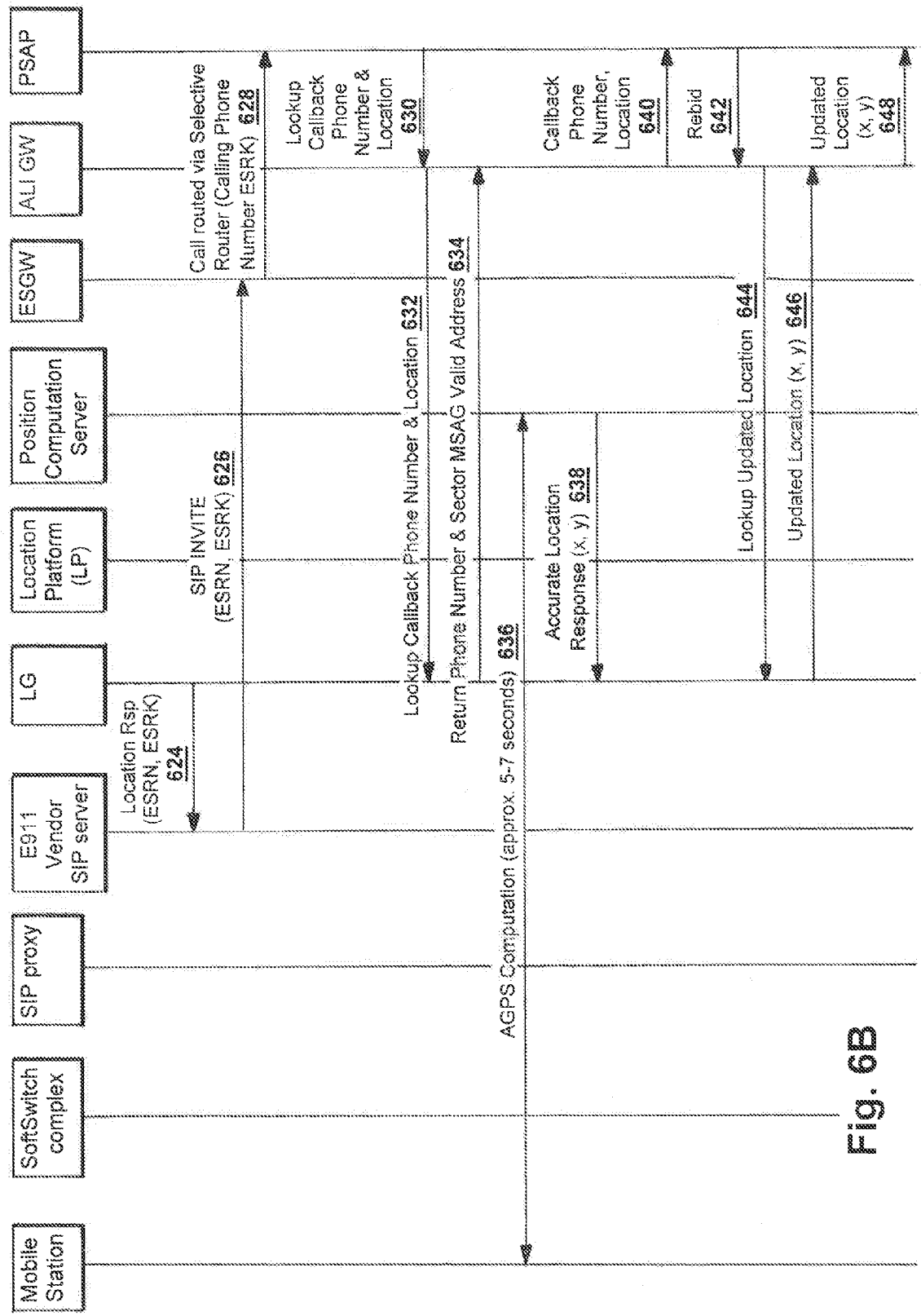

FIGS. 6A and 6B are exemplary call flow diagrams for an emergency call initiated by a mobile station using VoIP over a fourth generation network, such as a WiMAX or LTE network with re-bid to obtain more accurate location information. The call flow of FIGS. 5A-5B is similar to that of FIGS. 6A-6B, except that the call flow of FIGS. 6A-6B provides a more precise location of the mobile station. In particular, the call flow of FIGS. 5A-5B provides support for E911 Phase I, whereas the call flow of FIGS. 6A-6B provides support for E911 Phase II.

Steps 602-616 of FIG. 6A are similar to those of steps 502-516 of FIG. 5A, and will not be repeated. In response to receiving the location response message (step 616), the location gateway sends an accurate location request message that includes the MAC address of the mobile station's wireless radio to the position computation server (step 618). The position computation server then sends an AGPS INIT message (e.g., an AGPS SUPL INIT message) to the mobile station to assist it in obtaining its GPS location (step 620). The location gateway then maps the BSID to the appropriate PSAP, selects the ESRK key and then maps the telephone number to the ESRK (step 622). For ease of illustration the base station identification mapping (steps 614 and 616) are illustrated as being performed prior to the AGPS supplemental determination (steps 618 and 620), however these steps will be performed in parallel.

Turning now to FIG. 6B, the location gateway then provides a location response message that includes the ESRN and ESRK to the emergency 911 vendor SIP server (step 624). The emergency 911 vendor SIP server then sends a SIP INVITE message that includes the ESRN and ESRK to the emergency services gateway (step 626), which then routes the call via the selective router to the appropriate PSAP (step 628). The PSAP sends a lookup request for the callback number and location to the ALI gateway (step 630), which sends the lookup request to the location gateway (step 632). The location gateway then returns the telephone number and sector MSAG valid address (step 634).

The mobile station performs an assisted GPS (AGPS) computation, which takes approximately five to seven seconds, using information obtained from the position computation server (step 636). Once the position computation server has obtained the accurate location of the mobile station, it sends a location response to the location gateway (step 638). For the Phase 1 flow, the ALI gateway sends the callback number and location to the PSAP (step 640). When a more accurate location is desired the PSAP attendant initiates a re-bid request, which initiates the transmission of a re-bid message requesting the more accurate location (step 642). The ALI gateway sends a request to look up the updated location of the mobile station to the location gateway (step 644), which responds with the updated location (step 646). The ALI gateway sends the updated location to the PSAP (step 648). Although FIGS. 6A and 6B describe the more accurate location information being based on GPS information, the more accurate location information can be obtained using triangulation and/or a hybrid of GPS and triangulation.

FIGS. 7A and 7B are exemplary call flow diagrams for an emergency call initiated by a mobile station using VoIP over a wireless local area network, such as a WiFi network. Initially, the mobile station generates a SIP INVITE message formatted in the manner described above in connection with FIGS. 1A and 1B and forwards the message to the softswitch complex (step 702). In particular, the message includes the user name, the indication that the call is from a mobile station, the MAC address of the mobile station's radio, the type of radio and the MAC address of the access point currently supporting the mobile station. The softswitch complex converts the SIP user name into a telephone number and forwards the SIP INVITE message to the SIP proxy (step 706), which then forwards the message to the emergency 911 vendor SIP server (step 708).

The emergency 911 vendor SIP server then sends a location request message, including the mobile station indication, the MAC address of the mobile station's radio, the type of radio and access point MAC address, to the location gateway (step 710). When the SIP INVITE message from the mobile station does not include a base station identification, the location gateway determines that it should interact with the location platform (step 712) and sends a location request message (e.g., an SLIR message) that includes the MAC addresses for the mobile station and the access point to the location platform (step 714). The location platform can determine the location of the mobile station by comparing the access point's MAC address to a database of access point locations. The location platform then responds with a location response message (e.g., an SLIA message) that includes the access point location (step 716).

Turning now to FIG. 7B, the location gateway then maps the BSID to the appropriate PSAP, chooses the ESRK, ESRN keys, and maps the calling number to the ESRK and the called number to the ESRN (step 718). The location gateway then sends a location response that includes the ESRK and ESRN to the emergency 911 vendor SIP server (step 720). The emergency 911 vendor SIP server sends a SIP INVITE message that includes the ESRN and ESRK to the emergency services gateway (step 722), which then routes the call via the selective router to the PSAP (step 724). The PSAP then sends a lookup request for a callback number and location to the ALI gateway (step 726). The ALI gateway then sends the lookup request that includes the ESRK to the location gateway (step 728), which returns the telephone number and sector MSAG valid address (step 730). The ALI gateway then forwards the callback number and location to the PSAP (step 732). When a more accurate location is desired the PSAP attendant initiates a re-bid request, which initiates the transmission of a re-bid message requesting the more accurate location (step 734). The ALI gateway sends a request to look up the updated location of the mobile station to the location gateway (step 736), which responds with the updated location (step 738). The ALI gateway sends the updated location to the PSAP (step 740). Although not illustrated, the more accurate location information is obtained by the re-bid requires the system to perform steps similar to those of steps 620, 636 and 638 of FIGS. 6A and 6B.

The call flow diagrams of FIGS. 7A and 7B rely upon a network database of location of WiFi access points. When the location of WiFi access points cannot be obtained from a database (e.g., the database is not available, the location information is not in the database, the network does not include such a database, etc.), then the call flow of FIG. 8 can be employed. Steps 802-808 are similar to those of steps 702-708, and accordingly these steps will not be described again in detail. In the call flow of FIG. 8 the location request message is sent from the E911 vendor's SIP server to the location gateway (step 810), which determines that the location of the calling mobile station can not be obtained from a database and responds with a Location Not Found message (step 812). The E911 vendor SIP server then transfers the call to a call center (step 814) where an operator establishes a voice call with the user of the mobile station to obtain location information (step 816). The call center operator then identifies the appropriate PSAP (step 818) and the call center transfers the call to the identified PSAP (step 820). The emergency call is then established between the PSAP and the calling mobile station (step 822).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising:
   receiving, by a mobile station processor, an address for a call to a destination;
   determining, by the mobile station processor, that the address is an emergency call address;
   determining, by the mobile station processor, that the call will be supported using Voice over Internet Protocol (VoIP);
   instructing, by the mobile station processor, a wireless radio to transmit a call setup request directed to the emergency call address, the call setup request including an indication that the emergency call is from a mobile station employing VoIP,
   wherein the mobile station processor includes a Medium Access Control (MAC) address of the wireless radio, a type of the wireless radio that will transmit the call setup request and a tower identification in the call setup request.

2. The method of claim 1, wherein the call setup request includes a Session Initiation Protocol (SIP) Invite message and the indication that the emergency call is supported using VoIP is included in a header of the SIP Invite message.

3. The method of claim 1, further comprising:
   including, by the mobile station processor, an indication of a type of emergency call services supported by the mobile station.

4. The method of claim 3, wherein the indication of the type of emergency call services supported by the mobile station is included in a header of the SIP Invite message.

5. The method of claim 4, wherein the type of emergency call services is E911 Phase I or E911 Phase II.

6. The method of claim 1, comprising:
   receiving, by the mobile station, assisted global positioning satellite (AGPS) information from a wireless network;
   determining, by the mobile station, the mobile station's current location using the AGPS information and signals from GPS satellites; and
   providing the determined location to the wireless network.

7. The method of claim 6, wherein a call is established between the mobile station and a public safety answer point (PSAP) and the determined location is provided from the mobile station to the PSAP via the wireless network subsequent to establishment of the call between the mobile station and the PSAP.

8. The method of claim 6, wherein the network is a WiMAX or LTE network.

9. The method of claim 1, wherein a location gateway receives a message with the indication that the emergency call is from a mobile station employing VoIP and determines based on this indication that a location of the mobile station should be obtained from a location platform.

10. The method of claim 1, wherein the wireless radio is a second wireless radio and the mobile station processor attempts to initiate a call to the emergency call address using
 a first wireless radio prior to the determination that the call will be supported using VoIP, and
 the second wireless radio when the call is not completed using the first wireless radio.

11. The method of claim 1, wherein the wireless radio is a third wireless radio and the mobile station processor attempts initiate a call to the emergency call address using
 a first wireless radio prior to the determination that the call will be supported using VoIP,
 a second wireless radio when the call is not completed using the first wireless radio, and
 the third wireless radio wherein when the call is not completed using the second wireless radio.

12. The method of claim 11, wherein the first wireless radio operates using circuit-switched voice communication, and the second and third wireless radios operate using packet-switched communications.

13. The method of claim 11, wherein the first wireless radio attempts to connect to a network using time division multiple access (TDMA) or code division multiple access (CDMA), the second wireless radio attempts to connect to a wireless network using WiMAX or Long Term Evolution (LTE), and the third radio attempts to connect to a wireless network using Wi-Fi.

14. A mobile station, comprising:
 a wireless radio;
 a memory; and
 a processor, coupled between the wireless radio and the memory, wherein the processor includes:
  logic to determine whether a received address is an emergency call address; and
  logic to determine that the call will be supported using Voice over Internet Protocol (VoIP);
  logic to format a call setup request directed to the emergency call address by including an indication that the emergency call is from a mobile station employing VoIP,
 wherein the formatted call setup request is transmitted to a wireless network using the wireless radio, and
 wherein the logic to format includes a Medium Access Control (MAC) address of the wireless radio, a type of the wireless radio that will transmit the call setup request and a tower identification in the call setup request.

15. The mobile station of claim 14, wherein the call setup request includes a Session Initiation Protocol (SIP) Invite message and the indication that the emergency call is supported using mobile VoIP is included in a header of the SIP Invite message.

16. The mobile station of claim 14, wherein the logic to format includes an indication of a type of emergency call services supported by the mobile station.

17. The mobile station of claim 16, wherein the indication of the type of emergency call services supported by the mobile station is included in a header of the SIP Invite message, and wherein the type of emergency call services is E911 Phase I or E911 Phase II.

18. The mobile station of claim 14, wherein the mobile station
 receives assisted global positioning satellite (AGPS) information from a wireless network;
 determines the mobile station's current location using the AGPS information and signals from GPS satellites; and
 provides the determined location to the wireless network.

19. The mobile station of claim 18, wherein a call is established between the mobile station and a public safety answer point (PSAP) and the determined location is provided from the mobile station to the PSAP via the wireless network subsequent to establishment of the call between the mobile station and the PSAP.

20. The mobile station of claim 18, wherein the network is a WiMAX or LTE network.

21. The mobile station of method of claim 14, wherein the wireless radio is a second wireless radio, the mobile station also includes a first wireless radio, and the mobile station processor includes logic to attempt to initiate a call to the emergency call address using
 the first wireless radio prior to the determination that the call will be supported using VoIP, and
 the second wireless radio when the call is not completed using the first wireless radio.

22. The mobile station of claim 14, wherein the wireless radio is a third wireless radio, the mobile station also includes first and second wireless radios, and the mobile station processor includes logic to attempt initiate a call to the emergency call address using
 the first wireless radio prior to the determination that the call will be supported using VoIP,
 the second wireless radio when the call is not completed using the first wireless radio, and
 the third wireless radio wherein when the call is not completed using the second wireless radio.

23. The mobile station of claim 22, wherein the first wireless radio operates using circuit-switched voice communication, and the second and third wireless radios operate using packet-switched communications.

24. The mobile station of claim 22, wherein the first wireless radio attempts to connect to a network using time division multiple access (TDMA) or code division multiple access (CDMA), the second wireless radio attempts to connect to a wireless network using WiMAX or Long Term Evolution (LTE), and the third radio attempts to connect to a wireless network using Wi-Fi.

* * * * *